United States Patent [19]

Campbell

[11] 4,288,895
[45] Sep. 15, 1981

[54] BEARINGS

[75] Inventor: Brian D. Campbell, Harrow Weald, England

[73] Assignee: The Glacier Metal Company, Limited, Middlesex, England

[21] Appl. No.: 53,518

[22] Filed: Jun. 29, 1979

Related U.S. Application Data

[63] Continuation of Ser. No. 849,465, Nov. 7, 1977, abandoned.

[30] Foreign Application Priority Data

Nov. 10, 1976 [GB] United Kingdom ............... 46708/76

[51] Int. Cl.³ ............................................. B21D 53/10
[52] U.S. Cl. ....................... 29/149.5 C; 219/121 LM; 308/237 R; 308/179
[58] Field of Search ................................ 308/23–23.5, 308/167, 179–179.5, 237 R, 237 A, 238, 239, DIG. A; 219/121 EB, 121 EM, 121 L, 121 LM, 149.5 PM; 29/149.5 S, 149.5 DP, 149.5 C, 149.5 R

[56] References Cited

U.S. PATENT DOCUMENTS

| | | | |
|---|---|---|---|
| 1,999,599 | 4/1935 | Smith, Jr. | 29/149.5 R |
| 2,250,561 | 7/1941 | Wissler | 29/149.5 R |
| 2,259,023 | 10/1941 | Clark | 29/149.5 R |
| 3,624,881 | 12/1971 | Brown et al. | 308/237 R X |
| 3,713,714 | 1/1973 | Hill et al. | 308/237 R |
| 4,008,927 | 2/1977 | Mayer | 308/23 |
| 4,044,441 | 8/1977 | Morrison | 29/149.5 R |
| 4,045,646 | 8/1977 | Lichte | 219/121 EB |

Primary Examiner—Nicholas P. Godici
Assistant Examiner—V. K. Rising
Attorney, Agent, or Firm—Oblon, Fisher, Spivak, McClelland & Maier

[57] ABSTRACT

This invention is a method of making a flanged half-bearing in which a semi-cylindrical journal bearing shell and two semi-annular end flanges are held in a jig with one flange in contact with each axial end of the shell over a part only of the thickness of the shell, and are welded together by a laser beam weld. The use of laser beam welding together with the restricted area of contact between the shell and the flanges enables the bearing to be made with very little distortion.

15 Claims, 2 Drawing Figures

BEARINGS

This is a continuation of application Ser. No. 849,465, filed Nov. 7, 1977 now abandoned.

BACKGROUND OF THE INVENTION

1. Field of the Invention

This invention relates to flanged half bearings that is to say, plain bearings each of which consists of a semi-cylindrical shell with a semi-annular end flange at one or each end, so that the complete half bearing is capable of supporting journal loads and axial loads in one or both directions. The bearings will frequently carry a lining on the bearing surfaces of a material having a lower melting point than the material of the shells and flanges themselves.

2. Description of the Prior Art

Until now such flanged half bearings have been manufactured from flat strips through a multi-process folding and curling operation, or by making the shells and the flanges separately, and having an arrangement for clipping them together. The first method has tended to be rather expensive in that many of the bearings made do not conform to the design requirements, and the latter method has tended to produce bearings which are not reliable because the flanges can become detached from the shells in use with disastrous results.

It is important with a flanged half bearing that the flange should be in a plane at right angles to the axis of the shell, and that the diameter of the shell should be accurately related to the diameter of the housing in which it is to fit. Whereas when the bearings are thin-walled bearings, that is to say bearings which are thin enough to have some flexibility to be capable of conforming with the housing in which they are mounted, there should be "freespread" which is the excess of the diameter at the edges of the shell over the diameter of the half housing in which it is to fit. A little "freespread" is usually required so that the bearing can be sprung into its housing, and in the limiting case where there is no difference between the two diameters, it is said that there is "zero freespread".

SUMMARY OF THE INVENTION

According to the present invention, in a method of making a flanged half bearing, the shell and one, or each, end flange are held in a jig with a flange in contact with one or each, axial end of the shell over a part only of the thickness of the shell, and a laser beam is applied around the semi-circular path where the inner face of the flange is in contact with the end of the shell to weld the flange and shell together.

The degree of overlap between the face of the flange and the end face of the shell is preferably limited to about 0.7 of the thickness of the shell, and that reduced overlap where the components have surfaces in contact, does enable laser beam or electron beam welding to unite the components without causing excessive distortion, particularly if the laser beam is controlled so that the weld does not extend completely through the thickness of the shell.

Thus it will be possible to weld the components together and then have a bearing in which the flange or flanges are truly perpendicular to the axis of the shell and other distortion is substantially non-existent so that the bearing can be used directly without any further machining operation.

Preferably the edges of the shell and flange are bevelled to remove the bearing lining from adjacent the weld, and a notch is defined at the edges of the bevelled portions in which the weld can lie.

The invention includes a flanged half-bearing comprising a semi-cylindrical shell and one or two semi-annular end flanges with a flange in contact with one or each axial end of the shell over a part only of the thickness of the shell, and being so held in contact by a laser beam weld extending in a semi-circular path between the shell and the flange.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figure 1:
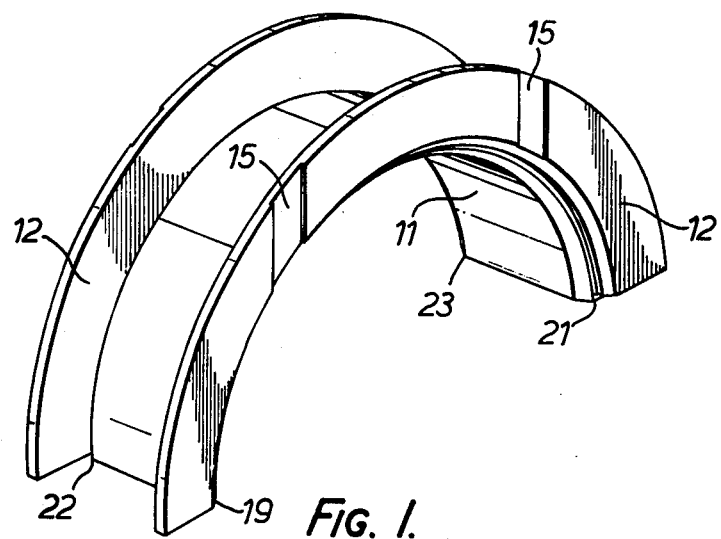
FIG. 1 is a perspective view of a double flanged half bearing shell made in accordance with the invention.

The bearing consists essentially of a semi-cylindrical shell 11 and two half annular end flanges 12. In the example being described, each of the components 11 and 12 is of an aluminum alloy carrying a softer bearing lining 13 or 14, for example an alloy of aluminum and tin, although many other bearing lining materials are known and would be suitable. The bearing shell and the flanges are formed separately by pressing from flat sheet material, and the complete double flanged bearing is formed by welding the flanges 12, one at each axial end of the shell 11. FIG. 1 shows that the bearing lining 14 of each flange 12 is removed over two strips perpendicular to the plane containing the edges of the bearing for the purpose of admitting lubricant, as indicated at 15.

Figure 2:
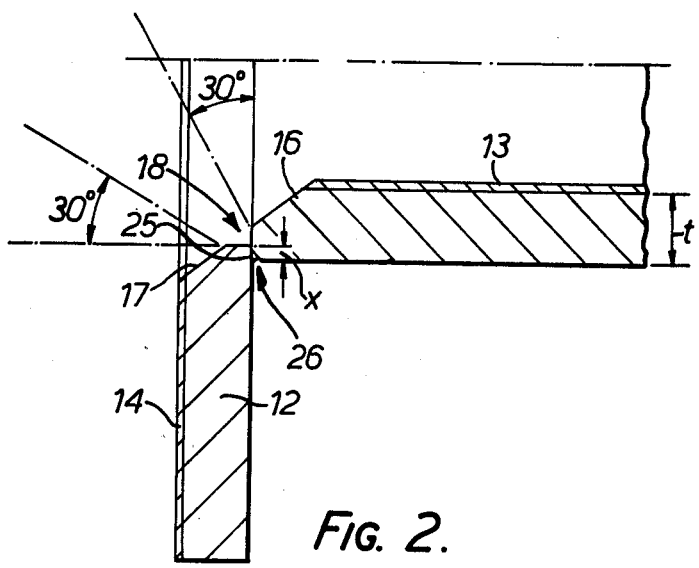
FIG. 2 is a section through a part of the bearing of FIG. 1 to an increased scale.

In manufacturing the complete bearing, the adjacent edges of the shell and the flanges are first bevelled at about 45° in a machining operation, as indicated at 16, and 17 in FIG. 2, and that has the effect of removing the lining material 13 and 14 from the area shown at 18 where the weld is to be formed.

Then the three components are located in a jig, which is conveniently a jig as described in Jack James Smith's U.S. application Ser. No. 760,698 filed Jan. 19, 1977, now U.S. Pat. No. 4,073,483. Then a laser beam is applied at the weld area 18, and the beam is moved in a semi circular arc around the bearing to form a continuous weld from one edge 19 to the other 21. The welding operation is repeated at the other edge from 22 to 23 as seen in FIG. 1.

In order to reduce distortions which may arise from local heating of the components during the welding operation, it has been discovered that the radial thickness of the shell 11 from its outer surface towards its lining 3 should only be overlapped by, and welded to, the inner edge of the flange 12 to a limited distance as indicated at 'x' in FIG. 2.

In general it is believed that the distance 'x' should be between 0.2 and 0.7 't' where 't' is the thickness of the shell 11, and in general the thicker the shell, the smaller can the factor 'x' be. In a typical case with a shell 0.125"

thick, the factor 'x' is 0.5, so that the overlap is for half the shell thickness.

The laser beam is preferably directed at an angle of 45° to the axis of the bearing shell and to the plane of the flange, but satisfactory results can be achieved in many cases, provided the angle of the laser beam is between 30° and 60° from the axis of the bearing shell.

The weld is indicated at 25 in FIG. 2, and it can be seen that the local area where melting of the materials 11 and 12 occurs is well removed from the nearest parts of the linings 13 and 14, and it has been found that due to the intense heat of a laser beam the welding can be performed quickly enough for the linings to be substantially undamaged.

The method described effects a compromise between the necessity of having the components secured together so reliably that they will not come apart in use, and the requirement that the degree of overlap shall be so small that the final bearing has sufficient springiness to allow it to be sprung into a corresponding housing, with which it has a limited amount of freespread.

It has been found that it is possible by the method described to produce a double flanged bearing in which the flanges are perpendicular to the axis of the shell and little or no machining is required after completion of the welding operations. The bearing can be made without reducing the freespread as defined, and with adequate fatigue strength.

It is to be noted from FIG. 2 that the weld can be seen from the inside of the angle between the back of the shell and the flange, in a notch 26 formed where the back of the shell is slightly chamfered.

That enables an inspector to see that the weld is properly made, while yet the molten material does not enter the right angle to interfere with the housing in which the bearing is to be heated.

A convenient laser power is between 1.5 and 5.0 kw for example 2 kw., and that enables a welding speed of 1" per second to be used. If on/off pulsed welding is used the speed can be increased.

What is claimed is:

1. A method of making a flanged half-bearing in which a semi-cylindrical shell having an outer face and an inner face, and a semi-annular end flange having an outer face and an inner face, are held with the inner face of the flange in contact with one axial end of the shell over a partial thickness comprising less than the entire thickness of the shell, said partial thickness encompassing said inner face of said shell and a laser beam is applied around a semi-circular path where the inner face of the flange is in contact with the end of the shell adjacent said inner face of said shell to weld the flange and shell together.

2. A method of making a flanged half-bearing in which a semi-cylindrical shell having an outer face and an inner face, and a semi-annular end flange having an outer face and an inner face, are held with the inner face of the flange in contact with one axial end of the shell over a partial thickness comprising less than the entire thickness of the shell, said partial thickness encompassing said inner face of said shell and a laser beam is applied around a semi-circular path where the inner face of the flange is in contact with the end of the shell to weld the flange and shell together, said partial thickness and said weld comprising less than the entire thickness of the shell.

3. A method as claimed in claim 1 or 2 in which the end of the shell and the flange are bevelled before the welding operation.

4. A method as claimed in claim 3 in which the shell and the flange carry a bearing lining of a material with a lower melting point than the shell and flange.

5. A method as claimed in claim 4 in which the bevelling removes the bearing linings adjacent the weld.

6. A method as claimed in claim 5 in which the weld lies in a notch defined between unbevelled parts of the end of the shell and the inner face of the flange.

7. A method as claimed in claim 1 in which the weld exists through a part only of the thickness of the shell.

8. A method as claimed in claim 2 in which the laser beam is directed at the shell and flange from a point radially within the inner face of the flange.

9. A method as claimed in claim 8 in which the laser beam is directed at an angle between 30° and 60° to the axis of the shell.

10. A method as claimed in claim 9 in which the laser beam is directed at an angle of 45° to the axis of the shell.

11. A method as claimed in claim 1 or 2 in which two flanges are welded, one at each end of the shell, and the welding operations are carried out one after the other.

12. A method as claimed in claim 1 or 2 in which the flange is in contact with the axial end of the shell over a distance between 0.2 and 0.7 of the thickness of the shell.

13. A method as claimed in claim 12 in which the flange is in contact with the axial end of the shell over a distance equal to 0.5 of the thickness of the shell.

14. A method of making a flanged half-bearing from a semi-cylindrical shell having bearing lining material on one outer face thereof and a pair of semi-circular flanges having bearing lining material on one face thereof, comprising the steps of:
contacting the other face of each flange against a radial portion of each semi-circular axial end of the shell along the entire semi-circular length of said end, said radial portion being less than the entire radial thickness of the shell and encompassing the other face thereof; and
applying a laser beam in a semi-circular path along the point of contact between the other face of said flange and said other face of said shell;
whereby the flanges are continuously welded to the shell along the entire semi-circular length of the shell.

15. A method of making a flanged half-bearing from a semi-cylindrical shell having bearing lining material on one outer face thereof and a pair of semi-circular flanges having bearing lining material on one face thereof, comprising the steps of:
contacting the other face of each flange against a radial portion of each semi-circular axial end of the shell along the entire semi-circular length of said end, said radial portion being less than the entire radial thickness of the shell and encompassing the other face thereof; and
applying a laser beam in a semi-circular path along the point of contact between the other face of said flange and said shell to weld said flange and shell, said weld and said partial thickness comprising less than said entire radial thickness;
whereby the flanges are continuously welded to the shell along the entire semi-circular length of the shell.

* * * * *